June 7, 1960 J. DOLZA 2,939,446
FUEL CONTROL UNIT
Filed Sept. 10, 1956 3 Sheets-Sheet 1
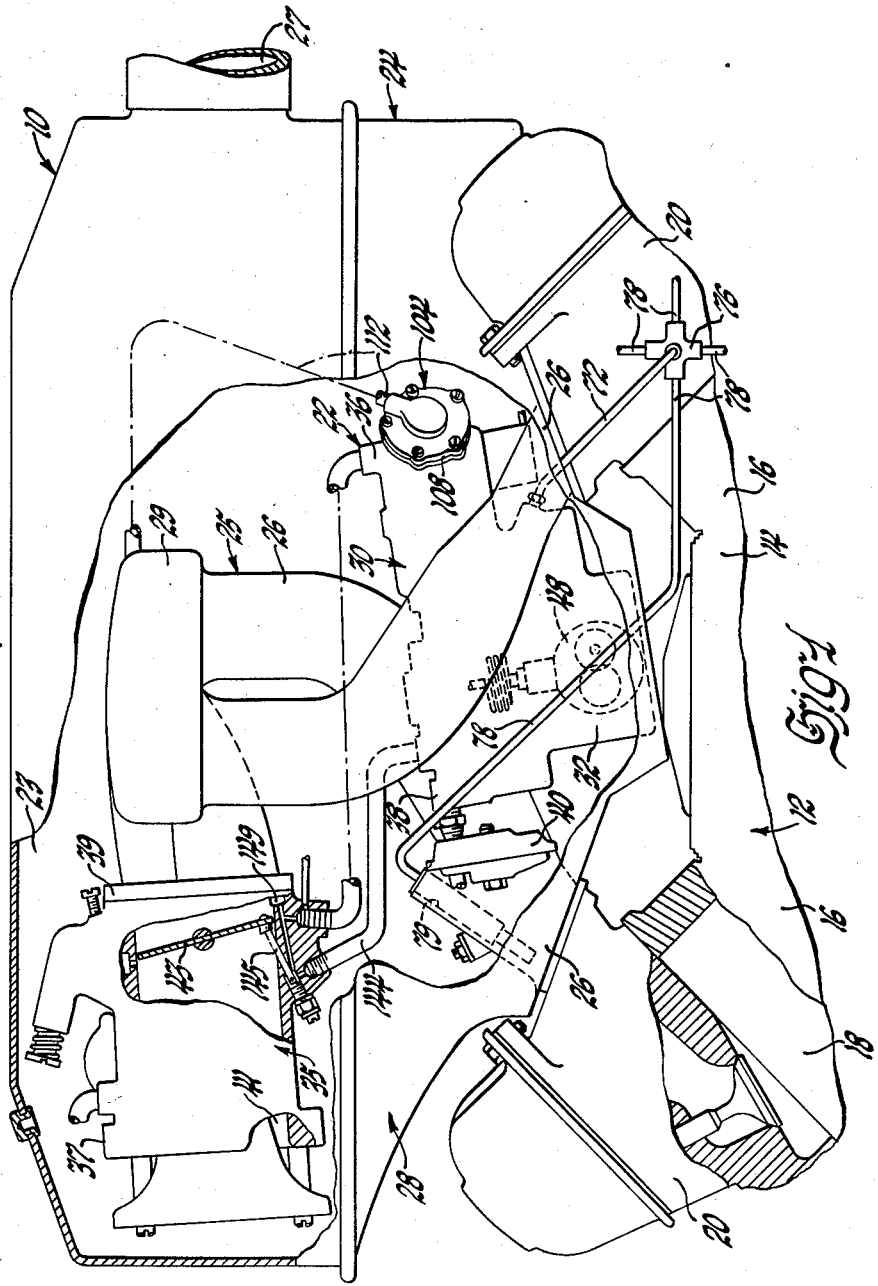
INVENTOR.
John Dolza
BY
L.D.Burch
ATTORNEY

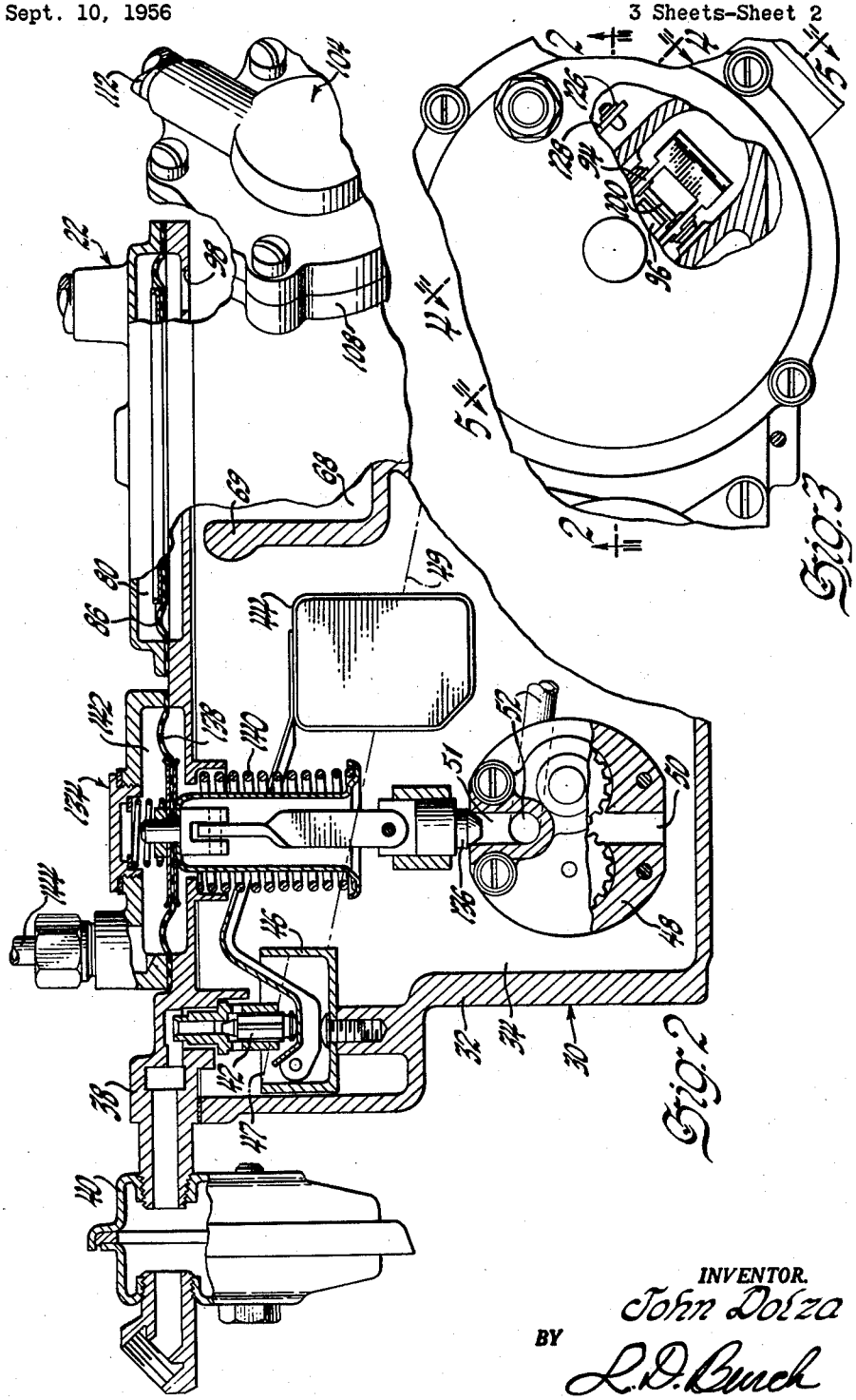

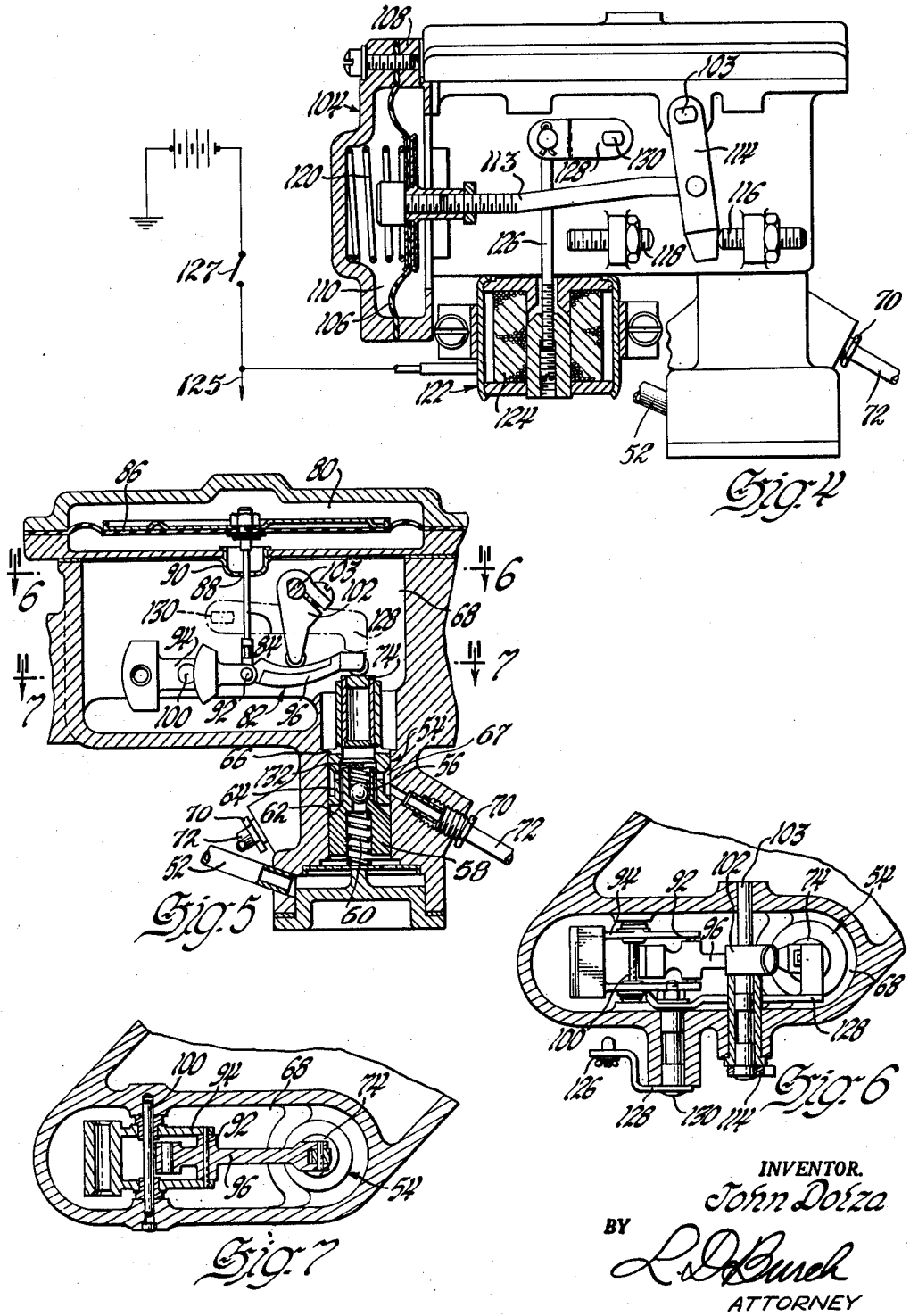

United States Patent Office 2,939,446
Patented June 7, 1960

2,939,446

FUEL CONTROL UNIT

John Dolza, Fenton, Mich., assignor to General Motors Corporation, Detroit, Mich., a corporation of Delaware Filed Sept. 10, 1956, Ser. No. 608,894

3 Claims. (Cl. 123—140)

This invention relates to a fluid control unit and is particularly applicable to a unit for controlling fuel to be delivered to the combustion chambers of an internal combustion engine.

One of the obstacles to the extended use of fuel injection charges in engines of the type commonly used in automotive vehicles has been the accurate control of the fuel under all conditions encountered while providing a dependable, sturdy, reasonably priced and effective control unit. It is now proposed to provide a fluid control unit which is especially adapted for use with automotive vehicle engines. It may also be adapted for use on stationary power plants of various types. The unit combines metering control accuracy with economy of manufacture, performance and maintenance. It may be assembled as an integral unit and includes a fluid pump, a fluid distributor, and various fluid delivery modification controls which may be desirable.

In the drawings:

Figure 1 is a fragmentary end view of an internal combustion engine equipped with a control unit embracing the invention.

Figure 2 is a cross sectional view of the control unit of Figure 1 taken substantially along line 2—2 of Figure 3.

Figure 3 is a fragmentary plan view of a portion of the control unit having parts broken away and in section.

Figure 4 is a cross sectional view taken substantially along line 4—4 of Figure 3.

Figure 5 is a cross sectional view taken substantially along line 5—5 of Figure 3.

Figure 6 is a cross sectional view taken substantially along line 6—6 of Figure 5.

Figure 7 is a cross sectional view taken substantially along line 7—7 of Figure 5.

The invention may be incorporated in a charge-forming unit 10 that is adapted to be employed on an internal combustion engine 12. Engine 12 may be of any suitable type, however in the present instance it is illustrated as a V-type engine. The engine 12 includes a cylinder block 14 having a pair of angularly disposed cylinder banks 16 with cylinders 18 formed therein and leaving an upwardly opening space therebetween. A cylinder head 20 is secured along the top of the aligned cylinders 18 of each bank 16 to close the ends of the cylinders 18 and thereby form combustion chambers. Each cylinder head 20 includes a separate intake passage for each of the cylinders 18. The outer ends of these passages form intake ports while the opposite ends form intake valve seats opening into the combustion chamber, as is well known in the art. In order to supply a combustible charge of air and fuel to each of the cylinders through the intake passages, charge-forming unit 10 includes an air induction system 28 and a fuel injection system 22 which are enclosed in a shroud 24 and adapted to be removably secured to the engine 12 in the space between the two banks 16 of cylinders 18. Sheet metal shroud 24 form an enlarged plenum chamber 23 and an intake manifold 25 that is disposed inside the chamber. The shroud 24 has an atmospheric inlet 27 with a filter therein so that the plenum chamber 23 will be filled with filtered air. The intake manifold includes a body 29 having a chamber therein and a plurality of induction passages 26 that depend therefrom to be secured to the cylinder heads 20 and communicate with the intake passages for charging the engine cylinders. An air meter 35 is mounted on the side of the manifold with a passage extending therethrough so that one end 37 opens into the plenum chamber 23 and the other end 39 communicates with the chamber 29 in the manifold. The air meter 35 includes a metering restriction 41 adapted to produce a pressure differential indicative of the air flow and a throttle valve 43 for regulating the air flow. Thus the air meter 35 may draw filtered air from the inside of the plenum chamber 23 and deliver throttled air to the intake manifold for distribution to the various cylinders. The fuel control unit 30 may be disposed in the plenum chamber 23 of charge-forming unit 10 and completely enclosed by the shroud 24.

The fuel control unit 30 includes a housing 32 having a float bowl or supply portion 34 and a metering portion 36. A fuel inlet 38 is provided adjacent the supply portion 34 and has a secondary filter element 40 attached thereto which is adapted to remove any minute particles which might otherwise impair the operation of the unit. Needle valve 42 controls admission of fuel from inlet 38 into the float bowl 34 and may be actuated by a pivoted float 44. A vapor separator 46 may be disposed immediately below needle valve 42 and is comprised of an upwardly opened bowl so mounted that all of the fuel passing through needle valve 42 must flow into the separator 46 and overflow from the top thereof at 47. Any vapor entrained in the fuel will be removed by the resulting agitation.

A fuel pressure pump 48, preferably of the gear type, may be mounted in the bottom of the float bowl 34 below the normal level 49 of the fuel maintained in the float bowl. Pump 48 provides injection pressure for the fuel system. It is preferably completely immersed in the fuel in order to insure priming at all times and to permit pump 48 to deliver fuel from the float bowl without creating a material fuel pressure reduction in the pump inlet 50. This position of the pump also materially aids the prevention of vapor lock. Gasoline, which may be used as the fuel, is particularly susceptible to formation of vapor at high temperatures. If the fuel being pumped is below the pump inlet, pressure between the fuel reservoir and the pump is decreased and the fuel may boil at the lower temperatures due to this decrease in pressure. The resulting vapor will cause a vapor lock. If, however, as in the unit here disclosed, the fuel pump 48 is immersed in the fuel, with the pump inlet 50 positioned well under the fuel surface 49, there will be a pressure equal to the fuel head on the pump inlet and there will be no tendency to form vapor at that point.

The output of pump 48 is connected with a passage 52 that extends diagonally through housing 32 and intersects the bottom of a cylindrical fuel distributor 54 located in the metering portion 36 of the unit. The lower portion of distributor 54 includes a pressure sensitive check valve 56 which is located inside valve housing 58. Valve housing 58 may be reciprocably disposed in the bottom of the cylindrical distributor passage and is biased upwardly by a spring 60 so that the tapered end 62 of the valve housing engages the lower end of a guide member 64. The check valve 56 is comprised of a spring biased ball that is effective to maintain a predetermined pressure beyond the valve. After the fuel passes through check valve 56 it is divided into two parts. The surplus fuel passes through spill port 66 in the guide member 64 and is returned to the float chamber 34 by overflowing from linkage chamber 68 over an opening provided in wall 69 which separates the fuel supply portion 34 from the metering portion 36. The metering portion of the fuel flows through distributing chamber 67 and outlet 70 into the distributor lines 72 which are connected to distributor blocks 76. Distributor blocks 76 in turn have injector lines 78 connected thereto which lead to injector nozzles 79 which are positioned to inject the metered fuel into the air charges for the internal combustion engine. The volume of the metered fuel is controlled by regulating the amount of fuel by-passed through spill ports 66. The by-passed fuel is regulated by a plunger valve 74 reciprocably disposed in a passage through guide member 64 and having the periphery of its lower end registering with spill ports 66. In operation it has been found to be desirable to use a pair of distributor lines 72 so that they will always symmetrically intersect the distribution chamber 67 of distributor 54. The pressure in the distribution chamber of distributor 54 is indicative of the amount of metered fuel discharged through the fuel injector nozzles. Since the area of piston valve 74 is subjected to this pressure, there is in existence a force proportional to the fuel flow which tends to open valve 74 and increase the amount of fuel by-passed through spill ports 66.

The metering portion 36 also includes a diaphragm chamber 80 that is interconnected with a port in the air induction system which senses air mass flow in that system. It further includes a linkage chamber 68 which has linkage 82 mounted therein for operatively interconnecting the diaphragm 86 with plunger valve 74. Linkage 82 includes a vertical pin 84 which is connected at its upper end to diaphragm 86 and extends downwardly through a small hole 88 in the cup 90. Its lower end is attached to a pivoted joint 92 between counterweight lever 94 and control lever 96. It is desirable to have pin 84 pass through as small a hole 88 as possible in order to eliminate the passage of fuel vapors into the chamber below diaphragm 86. It is likewise desirable to provide a relatively large vent 98 to the atmosphere in order that any fuel vapors which may enter the chamber may be quickly dissipated, thereby eliminating any vapor pressure effects on diaphragm 86. Counterweight lever 94 is pivoted about a fixed pin 100 while the control lever 96 rotates about the end of an adjustable mixture control arm or ratio cam 102 so that the outer end of arm 102 rests on and tends to depress the plunger valve 74 to close the spill ports 66. Arm 102 is pivotally supported by shaft 103.

As induction air passes through the air induction system, a signal is transmitted to diaphragm chamber 80 which acts on diaphragm 86 and, by means of linkage 82, produces a downward force on plunger valve 74 which opposes the upward forces on that valve produced by the fuel pressures, as described above. These opposing forces will cause plunger 74 to move axially to increase or decrease the amount of by-passed fuel until the two forces are in balance. Under these circumstances, the induction air and the metered fuel will be flowing in predetermined proportions. These proportions are determined by the mechanical advantage of the linkage 82 which is, of course, regulated by the position of ratio arm 102 which operates as the fulcrum for control lever 96.

During the normal operating condition of an automotive internal combustion engine, the engine is operated at part load and is seldom required to develop maximum power. It is therefore desirable to normally supply a lean charge suitable for maximum economy and to supply a richer charge suitable for maximum power only under those circumstances where the engine operating condition for production of maximum power is required and economy is of secondary importance. This objective may be accomplished in several ways. It is advantageous with the preferred embodiment here disclosed to retain the mixture control arm 102 in a normal position to give maximum economy and to provide a maximum power enrichment mechanism 104 for moving the arm 102 to a position giving a richer mixture suitable for maximum power. It is well known that during part load of an internal combustion engine of the automotive type that there is a considerable induction vacuum, while at full throttle or maximum power operation, the induction vacuum is relatively small. The maximum power enrichment mechanism 104 is therefore connected to be sensitive and responsive to the air induction vacuum. It is provided with a diaphragm 106 for this purpose which is disposed in a housing 108 to form a diaphragm chamber 110 which is interconnected with a fitting in the air induction system by means of an enrichment vacuum line 112. This fitting may include a passage that communicates with the induction system at a point downstream from the throttle valve so as to sense the induction vacuum. Diaphragm 106 is connected through link 113 to a crank 114 which is effective to change the position of ratio arm 102. A rich (maximum) stop 116 and a lean (minimum) stop 118 are provided to limit the swinging movement of crank 114. When the crank 114 is against the lean stop 118, ratio arm 102 is so positioned that the mechanical advantage of the linkage 82 will insure a lean charge suitable for maximum economy. When the crank 114 engages the other stop 116, linkage 82 is adjusted for a maximum power charge.

Diaphragm 106 is biased in opposition to the vacuum by spring 120. This spring has insufficient strength to overcome the vacuum except when it is very small resulting from maximum power requirements. The normal induction vacuum will therefore retain crank 114 against the lean stop 118, thereby insuring a charge commensurate with maximum economy. When the throttle in the air induction system approaches the fully opened position, however, and the intake vacuum is therefore very small, spring 120 will force diaphragm 106 outwardly, causing crank 114 to move toward the maximum power stop 160. This will result in obtaining full power from engine 12.

When an internal combustion engine is being started, it is desirable to insure provision of an adequate supply of fuel to the cylinders, particularly during the cranking operation. A starting enrichment mechanism 122 is therefore desirable and may be operatively interconnected with the starting motor to be operative only when the starting motor is energized by the starting circuit. Starting enrichment means 122 will be effective to permit fuel injector pump 48 to pump the fuel into the charges more easily by substantially eliminating the pressure drop across check valve 56. The distributor 54 is therefore modified by starting enrichment mechanism 122 so that all of the fuel discharged from injector pump 48 by-passes check valve 56 and is delivered to the engine.

Starting enrichment mechanism 122 preferably includes an electrical solenoid 124 which is secured to housing 32 and is electrically connected in the starting motor electrical circuit 125 and controlled by starter switch 127. Solenoid 124 has a vertical plunger 126 with an upper end operatively interconnected with enrichment arm 128 disposed inside linkage chamber 68. Arm 128 is mounted to pivot about a fixed pin 130 and has one end disposed immediately above the end of control arm 96. When solenoid 124 is deenergized, as it is during normal engine operation, plunger 126 is retracted and enrichment arm 128 is spaced from the end of control arm 96. When solenoid 124 is energized, through energization of the engine starter circuit 125, plunger 126 is extended, causing enrichment arm 128 to rotate about pin 130 and strike its end opposite arm 128 against the end of control arm 96. The force transmitted through arm 128 moves control arm 96 and plunger valve 74 downwardly until the lower end of the valve engages projection 132 extending from the end of valve housing 58 and depresses housing 58 away from guide member 64. This movement will close spill ports 66 and unseat housing 58 from guide member 64, opening a by-pass around check valve 56. Consequently, the fuel from pump 48 may by-pass check valve 56 without being subjected to the pressure loss required to open that valve. All of the fuel delivered from the pump to the distributor is then directed to the air charges entering the engine cylinders, and none of the fuel will be by-passed for return to the float chamber. When the engine is running under its own power and the cranking motor is deenergized, solenoid 124 is also deenergized, allowing plunger 126 to be retracted and restoring normal metering action.

During normal operation of an internal combustion engine in an automotive vehicle, there are certain periods during which the load is over-running and driving the engine. The fuel supplied to and burned in the cylinder at that time performs no useful operation and is accordingly wasted. There are also indications that the very high induction vacuum resulting from the closed throttle valve during such operations interferes with complete combustion of the fuel, causing partially burned exhaust gases to be discharged to the atmosphere, adding to the contamination of the air. This problem is extremely important in certain areas where air pollution is critical. It is therefore desirable to decrease atmospheric contamination and increase fuel consumption economy by providing a fuel shutoff means 134 for eliminating fuel flow to the combustion chambers when the load is overrunning the engine. Fuel shutoff means 134 includes a shutoff valve 136 which is positioned in the outlet passage 52 from pump 48. Valve 136 may be opened by movement of diaphragm 138 and is normally retained in a closed position by a spring 140. This normally closed position allows normal delivery of the fuel to the distributor 54. When valve 136 is opened, however, fuel from the pump 48 will be by-passed directly into the float bowl reservoir 34. When this happens, there is inadequate pressure to open check valve 54 and therefore all of the fuel injected into the engine will be eliminated. It is well known that the highest induction vacuum is obtained when the engine is being overrun by the load with the air induction throttle valve closed. The vacuum thus obtained is higher than normal idling vacuum. The diaphragm chamber 142 above diaphragm 38 is therefore interconnected with the air induction system 28 by vacuum line 144 which communicates with a port 149 downstream of the throttle valve 43. A vent tube 145 upstream of the throttle valve 43 may be controlled by the throttle valve to be closed only when the throttle valve is in a closed position. Thus, when the valve 43 is opened, the air may flow through the vent tube 145 and reduce the amount of vacuum transmitted to the diaphragm chamber 142. When the throttle valve is closed, however, the vent tube may be closed, permitting induction vacuum to flow directly into the chamber 142. During normal operation spring 140 will hold the shutoff valve 136 completely closed, allowing the pump 48 to deliver fuel to distributor 54, where normal fuel metering action takes place. When the throttle valve 43 is completely closed and the load is driving the engine, however, a very high induction vacuum is transmitted through vacuum line 144 to diaphragm chamber 142. This vacuum signal will be large enough to exert a sufficient force on diaphragm 148 to compress spring 140 and open valve 136, allowing the fuel to be by-passed into float bowl 34 through outlet 51. Check valve 56 will be closed due to insufficient pressure and will prevent the distribution of any fuel to the cylinders. With the vacuum sensing system described, when the throttle valve is partially opened, substantially atmospheric air flows through the vent tube into line 144 and diaphragm chamber 142. There is then insufficient vacuum to actuate the valve 136. Therefore, as long as the operator maintains the throttle valve slightly open a supply of metered fuel will be supplied to the engine.

A control unit has thus been provided which efficiently and effectively controls fuel being delivered to an internal combustion engine and may be installed and replaced as an integral unit.

What is claimed is:

1. A mechanism for supplying fuel to individual cylinder nozzles for an internal combustion engine comprising a housing, a wall dividing said housing into a fuel reservoir section and a fuel metering section, a first cover casing adapted to enclose said housing, a fuel inlet valve disposed in said cover casing, said valve communicating with said fuel reservoir section, a float device disposed within the reservoir section and adapted to control the actuation of said inlet valve in accordance with the fuel level in the reservoir, a pump disposed below the normal fuel level in the reservoir section, a fuel metering valve disposed in said fuel metering section, a diaphragm, a second cover casing adapted to peripherally clamp said diaphragm upon the first cover casing, a linkage device disposed in said metering section and operatively connecting said diaphragm and said metering valve, passage means adapted to supply fuel under pressure from said pump to the fuel metering valve, an outlet passage for delivering metered fuel from the metering valve to said nozzles, said metering valve including a fuel bypass passage, said diaphragm being operable in accordance with engine demand to actuate the metering valve to decrease the fuel flow through the bypass passage as engine demand increases whereby fuel flow through said outlet passage increases, and an opening in said wall permitting the bypass fuel in the metering section to return to the reservoir.

2. A mechanism for supplying fuel to individual cylinder nozzles for an internal combustion engine comprising a housing, a wall dividing said housing into a fuel reservoir section and a fuel metering section, a first cover casing adapted to enclose said housing, a fuel inlet valve disposed in said cover casing, said valve communicating with said fuel reservoir section, a float device disposed within the reservoir section and adapted to control the actuation of said inlet valve in accordance with the fuel level in the reservoir, a pump disposed below the normal fuel level in the reservoir section, a fuel metering valve disposed in said fuel metering section, a diaphragm, a second cover casing adapted to peripherally clamp said diaphragm upon the first cover casing, a linkage device disposed in said metering section and operatively connecting said diaphragm and said metering valve, passage means adapted to supply fuel under pressure from said pump to the fuel metering valve, an outlet passage for delivering metered fuel from the metering valve to said nozzles, said metering valve including a fuel bypass passage, said diaphragm being operable in accordance with engine demand to actuate the metering valve to decrease the fuel flow through the bypass passage as engine demand increases whereby fuel flow through said outlet passage increases, and an opening in said wall permitting the bypass fuel in the metering section to return to the reservoir, a valve member associated with the output side of said pump, a second diaphragm, a third cover casing adapted to peripherally clamp the second diaphragm to the first cover casing, and linkage means connecting said second diaphragm with said valve member, spring means normally biasing the valve member in a closed position permitting fuel under pressure to be transmitted to the metering valve supply passage, said diaphragm being operable when engine manifold vacuum exceeds a predeterminted value to open the valve member cutting off fuel flow to said metering valve.

3. A mechanism as set forth in claim 1 in which the linkage device includes a lever articulated at one end to said diaphragm, the other end of said lever being adapted to engage said metering valve, an adjustable fulcrum member engaging said lever intermediate its ends, a pressure responsive device mounted on said housing, a link member interconnecting the pressure responsive device with the adjustable fulcrum member, the pressure responsive device including a spring element normally biasing the fulcrum member to a position causing an increase in the fuel supplied by the metering valve to said nozzles, normal engine manifold vacuum being adapted to actuate the pressure responsive device to shift the fulcrum member to decrease the fuel supplied by the metering valve to said nozzles.

References Cited in the file of this patent

UNITED STATES PATENTS

| | | |
|---|---|---|
| 1,164,093 | Houghton et al. | Dec. 14, 1915 |
| 1,252,440 | Howe | Jan. 8, 1918 |
| 2,136,959 | Winfield | Nov. 15, 1938 |
| 2,516,147 | Robinson | July 25, 1950 |
| 2,530,507 | Campbell | Nov. 21, 1950 |
| 2,673,556 | Reggio | Mar. 30, 1954 |